(12) United States Patent
Kang

(10) Patent No.: US 12,407,794 B2
(45) Date of Patent: Sep. 2, 2025

(54) METHOD AND APPARATUS FOR SVM TOP VIEW IMAGE PROCESSING

(71) Applicants: Hyundai Motor Company, Seoul (KR); Kia Corporation, Seoul (KR)

(72) Inventor: Min Chul Kang, Uiwang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 27 days.

(21) Appl. No.: 18/345,323

(22) Filed: Jun. 30, 2023

(65) Prior Publication Data

US 2024/0236276 A1 Jul. 11, 2024

(30) Foreign Application Priority Data

Jan. 9, 2023 (KR) .......................... 10-2023-0003098

(51) Int. Cl.
*B60R 1/27* (2022.01)
*G06T 7/70* (2017.01)
*H04N 5/262* (2006.01)
*H04N 7/18* (2006.01)

(52) U.S. Cl.
CPC .............. *H04N 7/183* (2013.01); *B60R 1/27* (2022.01); *G06T 7/70* (2017.01); *H04N 5/2628* (2013.01); *B60R 2300/105* (2013.01); *B60R 2300/30* (2013.01); *B60R 2300/607* (2013.01); *B60R 2300/806* (2013.01); *B60R 2300/8093* (2013.01); *G06T 2207/30261* (2013.01); *G06T 2207/30264* (2013.01)

(58) Field of Classification Search
CPC ................ B60R 2300/607; B60R 1/27; B60R 2300/8093; B60R 1/28; B60R 2300/105; B60R 2300/806; G06T 2207/30261; G06T 7/70; B60W 2050/146; B60W 50/14; B60W 2552/50; B60Y 2400/92; G06V 20/58
See application file for complete search history.

(56) References Cited

U.S. PATENT DOCUMENTS

| | | | |
|---|---|---|---|
| 2017/0028917 A1* | 2/2017 | Tauchi | H04N 23/90 |
| 2018/0137760 A1* | 5/2018 | Kobayashi | G08G 1/16 |
| 2018/0265004 A1* | 9/2018 | Kudou | H04N 7/18 |
| 2018/0330175 A1* | 11/2018 | Corcoran | G06V 10/147 |
| 2019/0215465 A1* | 7/2019 | Hayashi | H04N 5/2628 |
| 2020/0039506 A1* | 2/2020 | Woodbury | B60K 35/22 |
| 2020/0081607 A1* | 3/2020 | Yamamoto | B60R 1/002 |

(Continued)

*Primary Examiner* — Brian T Pendleton
*Assistant Examiner* — Humam M Satti
(74) *Attorney, Agent, or Firm* — Slater Matsil, LLP

(57) ABSTRACT

An embodiment image processing apparatus includes an image collector for collecting an image of surroundings around a vehicle using a camera attached to the vehicle, an object recognition sensor for collecting obstacle location information of an obstacle located around the vehicle, a first display for displaying a parking warning image based on the obstacle location information, a controller for generating a top view image based on the image of the surroundings and for determining to display the parking warning image based on the obstacle location information, wherein the controller generates the top view image focused on the obstacle based on the image of the surroundings and the obstacle location information, and a second display for displaying the top view image, wherein the controller automatically displays the top view image on the second display.

20 Claims, 13 Drawing Sheets

(56) References Cited

U.S. PATENT DOCUMENTS

| | | | | |
|---|---|---|---|---|
| 2020/0137322 | A1* | 4/2020 | Yokota | G06T 7/174 |
| 2020/0242374 | A1* | 7/2020 | Nakazawa | B60K 35/29 |
| 2020/0398824 | A1* | 12/2020 | Tsujino | B60W 60/0025 |
| 2021/0107511 | A1* | 4/2021 | Matsunaga | B60W 60/001 |
| 2022/0408062 | A1* | 12/2022 | Goto | B60R 1/22 |
| 2023/0012629 | A1* | 1/2023 | Shin | B60R 1/25 |
| 2023/0302999 | A1* | 9/2023 | Tsuda | H04N 23/54 |

* cited by examiner

METHOD AND APPARATUS FOR SVM TOP VIEW IMAGE PROCESSING

CROSS-REFERENCE TO RELATED APPLICATIONS

This application claims the benefit of Korean Patent Application No. 10-2023-0003098, filed on Jan. 9, 2023, which application is hereby incorporated herein by reference.

TECHNICAL FIELD

The present disclosure relates to a method and an apparatus for processing a surround view monitor (SVM) top view image.

BACKGROUND

The content described in this section merely provides background information on the present embodiments and does not constitute the prior art.

A surround view monitor (SVM) system is a parking assistance system which displays the surroundings of a vehicle with a top view image. Using this system, a driver can easily check parking lines or obstacles in blind zones through an indoor monitor.

The SVM system typically uses four super-wide-angle cameras each having the view angle of 180 degrees or greater. The SVM system performs a perspective transformation procedure for correcting images collected by the camera to transform the parking lines, which appear curved due to a super-wide-angle lens, into straight lines. After the perspective transformation, four images are combined into one to provide a top view image.

In the existing SVM system, top view images that may be selected by a driver are limited to (1) front and rear top view images and (2) omnidirectional standard, reduced, and enlarged top view images. In addition, it is inconvenient for the driver to manually select an appropriate top view image according to the parking situation.

On the other hand, the parking distance warning (PDW) system is a system which detects an object around the vehicle using ultrasonic waves and then warns the driver through an auditory or visual display.

The existing SVM system and PDW system operate independently. For this reason, there is a limit to a driver's ability to make detailed driving decisions in various parking situations. Therefore, there is a problem in that the situation around the vehicle is not more intuitively and clearly provided to the driver.

SUMMARY

The present disclosure relates to a method and an apparatus for processing a surround view monitor (SVM) top view image. Particular embodiments relate to a method and an apparatus for processing a SVM top view image which can provide top view images having different regions of interest to a driver in various parking situations in cooperation with a parking distance warning (PDW) system.

In view of the above, embodiments of the present disclosure provide a method and an apparatus that provide top view images having different regions of interest to a driver according to situations around a vehicle by operating a SVM system and a PDW system in cooperation with each other, so that it is possible to intuitively and clearly provide information around a vehicle to the driver, and it is possible to increase a driver's parking convenience.

Features achievable by embodiments of the present disclosure are not limited to the above-mentioned features, and other features which are not mentioned will be clearly understood by those skilled in the art from the following description.

According to an embodiment of the present disclosure, an image processing apparatus is provided. The image processing apparatus includes an image collection unit configured to collect an image of the surroundings around a vehicle using at least one camera attached to the vehicle. An object recognition sensor unit is configured to collect obstacle location information of an obstacle located around the vehicle using at least one object recognition sensor attached to the vehicle. A first display unit is configured to display a parking warning image based on the obstacle location information. A control unit is configured to generate a top view image based on the image of the surroundings, and to determine whether to display the parking warning image based on the obstacle location information. A second display unit is configured to display the top view image. When a determination is made to display the parking warning image, the control unit generates the top view image focused on the obstacle based on the image of the surroundings and the obstacle location information and automatically displays the top view image on the second display unit.

According to another embodiment of the present disclosure, an image processing method is provided, the image processing method including an image collection step of collecting an image of surroundings around a vehicle using at least one camera attached to the vehicle, a top view image display step of generating a top view image based on the image of the surroundings and displaying the top view image on a central display, an obstacle location information collection step of collecting obstacle location information of an obstacle located around the vehicle using at least one object recognition sensor attached to the vehicle, a parking warning determination step of determining whether to display a parking warning image based on the obstacle location information and displaying the parking warning image on a cluster display, and a top view image generation step of generating the top view image focused on the obstacle based on the image of the surroundings and the obstacle location information, when the parking warning image is displayed, and automatically displaying the top view image on the central display.

According to an embodiment of the present disclosure, it is possible to provide various top view images to a driver by operating a SVM system and a PDW system in cooperation with each other and providing different regions of interest according to various parking situations.

According to an embodiment of the present disclosure, it is possible to improve a driver's parking convenience by operating a SVM system and a PDW system in cooperation with each other and automatically changing a top view image.

Effects of embodiments of the present disclosure are not limited to the above-mentioned effects, and other effects which are not mentioned will be clearly understood by those skilled in the art from the following description.

DETAILED DESCRIPTION OF ILLUSTRATIVE EMBODIMENTS

Figure 1:
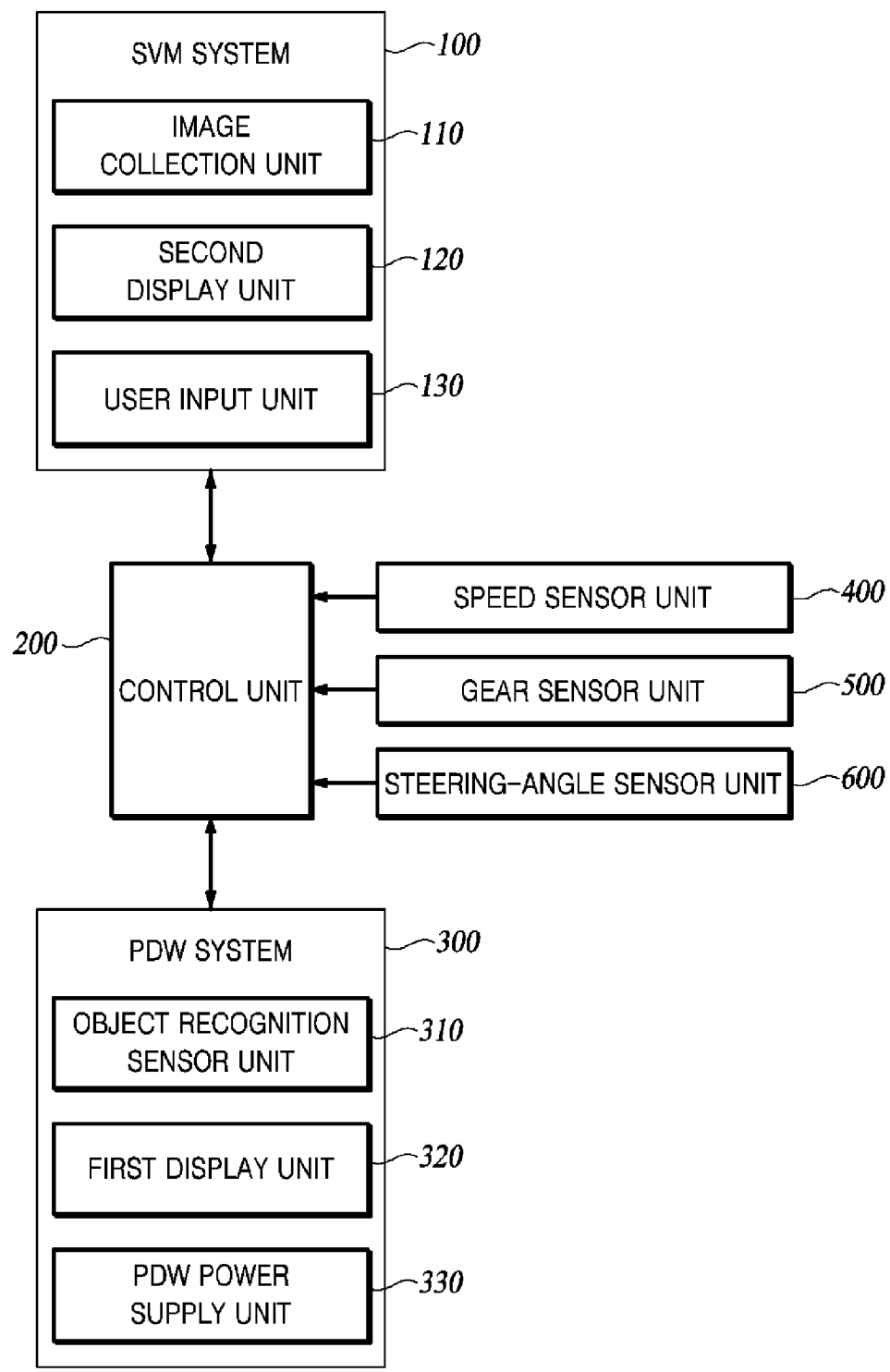
FIG. 1 is a block diagram illustrating the configuration of an image processing apparatus according to an embodiment of the present disclosure.

Hereinafter, some exemplary embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc. are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary.

The following detailed description, together with the accompanying drawings, is intended to describe exemplary embodiments of the present invention and is not intended to represent the only embodiments in which the present invention may be practiced.

FIG. 1 is a block diagram illustrating the configuration of an image processing apparatus according to an embodiment of the present disclosure.

Referring to FIG. 1, the image processing apparatus may include an SVM system 100, a control unit 200, a PDW system 300, a speed sensor unit 400, a gear sensor unit 500, and a steering-angle sensor unit 600.

Referring to FIG. 1, the SVM system 100 according to an embodiment may include an image collection unit 110, a second display unit 120, and a user input unit 130.

Figure 2:
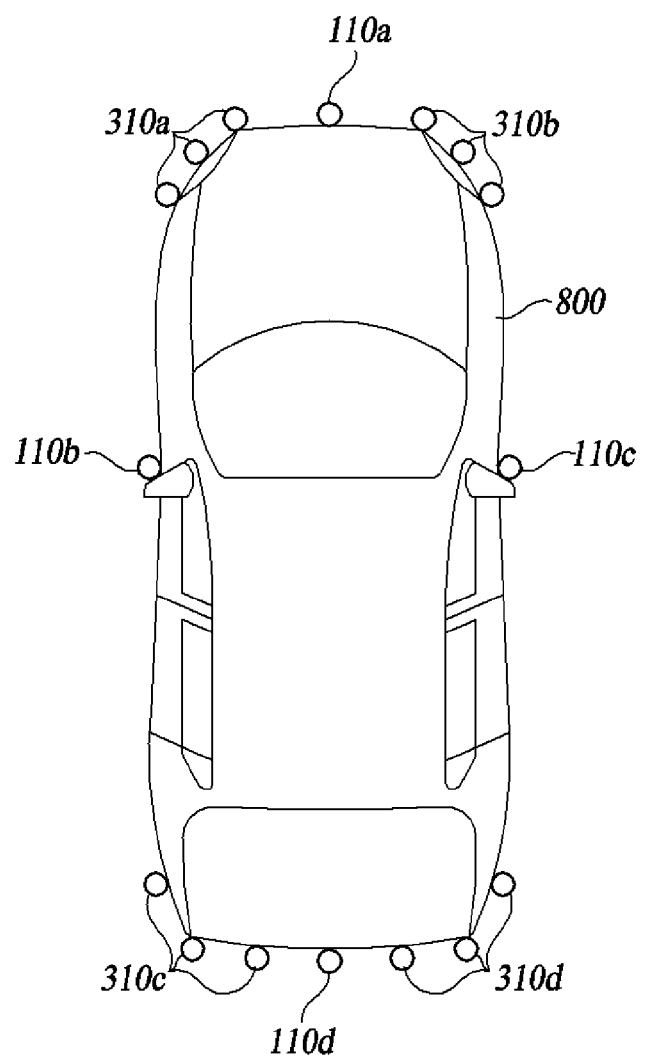
FIG. 2 is a diagram illustrating a camera and an ultrasonic sensor attached to a vehicle including the image processing apparatus according to an embodiment of the present disclosure.

Referring to FIG. 2, the image collection unit 110 may include cameras 110a to 110d. In an embodiment, the cameras 110a to 110d may be located on the front, rear, and/or left and right sides of the vehicle. The cameras 110a to 110d may collect images of the surroundings including obstacles (e.g., surrounding vehicles, pedestrians, pillars, etc.) by photographing the front, rear, and/or left and right sides of the vehicle. The image collection unit 110 may provide the collected images of the surroundings to the control unit 200.

The cameras 100a to 110d may include any one of an image sensor such as a complementary metal-oxide semiconductor (CMOS), a charge-coupled device (CCD) or an active pixel sensor, a linear lens, a concave lens, a convex lens, a wide-angle lens, or a fish eye lens. The camera 1100 may be analog or digital.

The second display unit 120 may display a top view image. The top view image may include a driver's vehicle, a surrounding vehicle, a pedestrian, a pillar, etc.

Figure 3:
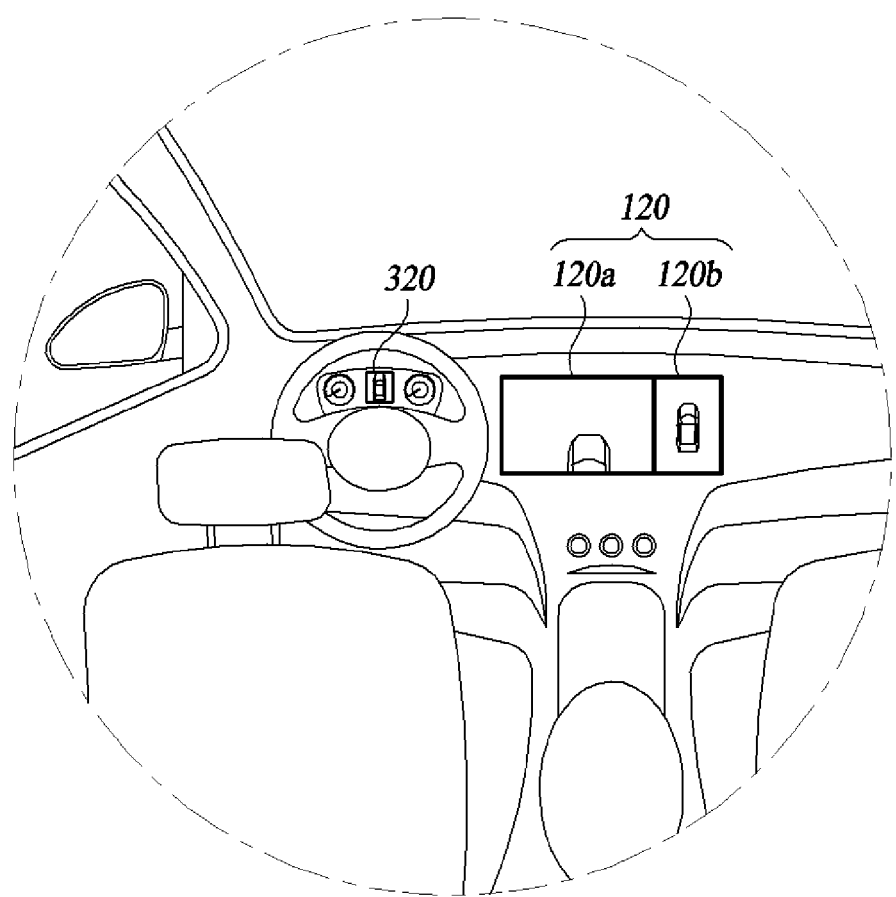
FIG. 3 is a diagram illustrating a cluster display and a central display attached to the vehicle including the image processing apparatus according to an embodiment of the present disclosure.

Referring to FIG. 3, in an embodiment, the second display unit 120 may be located on a dashboard of the vehicle disposed between a driver's seat and a passenger's seat. However, the second display unit 120 is not limited to the location shown in FIG. 3.

In an embodiment, the second display unit 120 may be divided into a first region 120a and a second region 120b. Referring to FIG. 3, the first region 120a may be located on the left side of the second display unit 120, while the second region 120b may be located on the right side of the second display unit 120. However, a screen of the second display unit 120 is not limited to the structure shown in FIG. 3.

In an embodiment, the second display unit 120 may display an image of the surroundings photographed through each of the cameras 110a to 110d on each of the screens 120a and 120b. The screen displayed on each of the first region 120a and the second region 120b will be described with reference to FIGS. 4A and 4B.

Figure 4A:
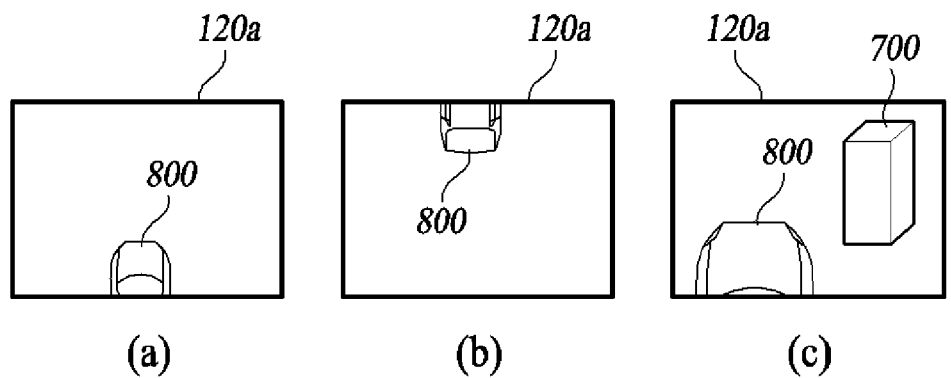
FIG. 4A is a diagram illustrating a top view image displayed on a first region of a second display unit according to some embodiments of the present disclosure.

FIG. 4A is a diagram illustrating some embodiments of the top view image displayed on the first region 120a of the second display unit 120.

In FIG. 4A, image (a) is the first region 120a showing the top view image of the front of the vehicle 800. In image (a) of FIG. 4A, a region of interest includes the entire front region of the vehicle 800.

In FIG. 4A, image (b) is the first region 120a showing the top view image of the rear of the vehicle 800. In image (b) of FIG. 4A, a region of interest includes the entire rear region of the vehicle 800.

When the region of interest is changed by a driver's manipulation or a cooperative operation between the SVM system 100 and the PDW system 300, image (c) of FIG. 4A is the first region 120a which displays the top view image of the changed region of interest. When the region of interest is changed, each of the cameras 110a to 110d readjusts a focal point and/or a principal point, and the control unit 200 changes the reference point of an image collected by the image collection unit 110 and then performs perspective transformation again.

The image displayed on the first region 120a is not limited to the embodiments shown in FIG. 4A. Those skilled in the art will recognize from embodiments of the present disclosure that various top view images having different regions of interest may be displayed on the first region 120a.

Figure 4B:
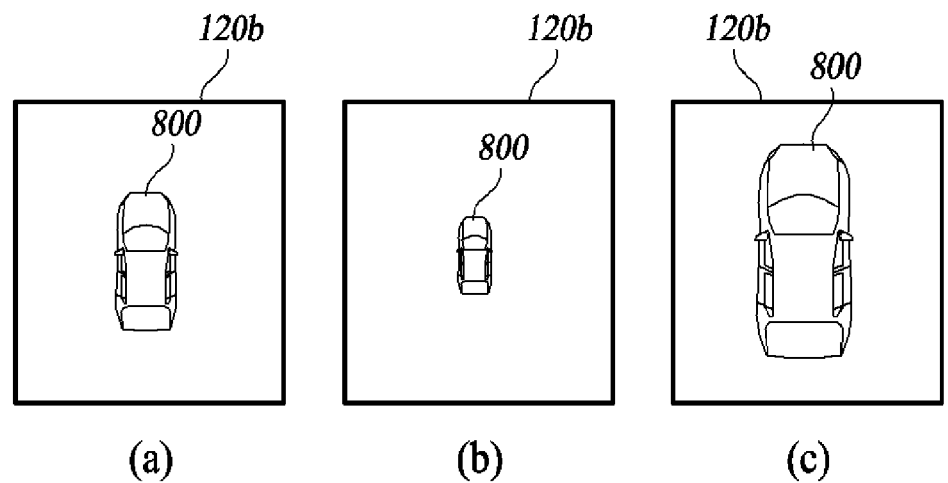
FIG. 4B is a diagram illustrating a top view image displayed on a second region of the second display unit according to some embodiments of the present disclosure.

FIG. 4B is a diagram illustrating some embodiments of the top view image displayed on the second region 120b of the second display unit 120.

In FIG. 4B, image (a) is a second region 120b displaying an omnidirectional standard top view image of the vehicle 800.

In FIG. 4B, image (b) is a second region 120b displaying an omnidirectional reduced top view image of the vehicle 800.

In FIG. 4B, image (c) is a second region 120b displaying an omnidirectional enlarged top view image of the vehicle 800.

The image displayed on the second region 120b is not limited to the embodiments shown in FIG. 4B. Those skilled in the art will recognize from embodiments of the present disclosure that various omnidirectional top view images having different sizes may be displayed on the second region 120b. Further, those skilled in the art will recognize from embodiments of the present disclosure that various configurations of top view images may be displayed on the second display unit 120. For example, each of the images displayed on the first region 120a and the second region 120b may overlap or have different relative sizes or different positions. Further, those skilled in the art will recognize from embodiments of the present disclosure that an additional or auxiliary screen may be provided in addition to the first region 120a and the second region 120b.

The second display unit 120 may be configured as a physical device including any one of an LCD display, an OLED display, an LED display, a flat panel display, and a transparent display, for example, but embodiments of the present disclosure are not limited thereto.

The user input unit 130 may apply power to the SVM system 100 or set the image of the first region 120a or the second region 120b by receiving a driver's input.

In an embodiment, the user input unit 130 may include a touch panel. The user input unit 130 may be coupled with the second display unit 120 to be provided as a touch screen. For example, the user input unit 130 may include an integrated module in which a touch panel is coupled to the central display, i.e., the second display unit 120, in a stacked structure.

In an embodiment, the user input unit 130 may sense a driver's touch input and may output a touch event value corresponding to the sensed touch signal. The touch panel may be implemented as various types of touch sensors such as a capacitive type, a resistive type, or a piezoelectric type.

The PDW system 300 is a parking assistance system and assists a driver in parking by notifying a driver of a collision possibility when there is a risk of collision between a surrounding object and the vehicle.

Referring to FIG. 1, according to an embodiment, the PDW system 300 may include an object recognition sensor unit 310, a first display unit 320, and a PDW power supply unit 330.

The object recognition sensor unit 310 may sense an object around the vehicle 800 and may provide information about the object to the control unit 200.

Referring to FIG. 2, the object recognition sensor unit 310 may include ultrasonic sensors 310a to 310d. The ultrasonic sensors 310a to 310d may be located on the front, rear, and/or left and right sides of the vehicle 800.

The ultrasonic sensors 310a to 310d may emit ultrasonic waves to the front, rear, and/or left and right sides of the vehicle 800 and may receive ultrasonic waves reflected from an obstacle (e.g., a surrounding vehicle, a pedestrian, a pillar, etc.). The object recognition sensor unit 310 may provide reflected ultrasonic-wave information to the control unit 200. The control unit 200 may calculate information about the location, speed, and/or angle of the obstacle based on the reflected ultrasonic-wave information.

When the object around the vehicle 800 is sensed by the PDW system 300, the first display unit 320 may display one or more pieces of information including a direction in which an object is located, a distance between the vehicle 800 and the object, and a collision risk.

Referring to FIG. 3, the first display unit 320 is disposed to face the driver's seat. However, the first display unit 320 is not limited to the location shown in FIG. 3. For example, the first display unit 320 may be coupled to the second display unit 120.

In some embodiments, the first display unit 320 may display a warning according to the warning level of the PDW system 300. In an embodiment, the warning level of the PDW system 300 may be divided into four levels.

Figure 5:
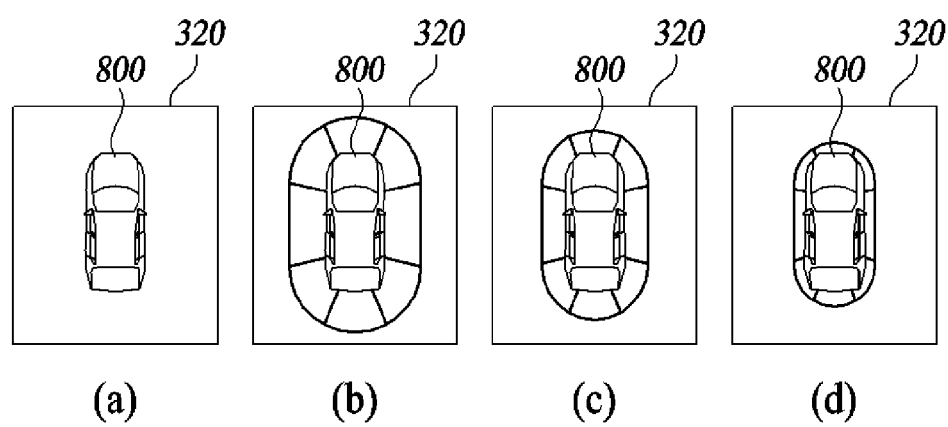
FIG. 5 is a diagram illustrating a warning image displayed on a first display unit according to some embodiments of the present disclosure.

FIG. 5 is a diagram illustrating an image displayed on the first display unit 320 for each warning level of the PDW system 300 according to an embodiment of the present disclosure. The warning level may be divided into a non-warning level, a first level, a second level, and a third level.

The first display unit 320 may notify the driver of each warning level by expressing a different image color for each warning level. By brightly displaying an area where an obstacle is located after dividing an area around the vehicle 800 in the image into a plurality of areas, the first display unit 320 may notify the driver of the location of the obstacle.

In FIG. 5, image (a) is an image displayed on the first display unit 320 in the non-warning level of the PDW system 300. In the case of the non-warning level, the area around the vehicle 800 is displayed darkly or lightly, e.g., with no surrounding oval as shown in images (b), (c), and (d), on the first display unit 320.

In FIG. 5, image (b) is an image displayed on the first display unit 320 in the first level warning of the PDW system 300. In the case of the first level warning, the first display unit 320 may display the entire area around the vehicle 800 in green or only an area (e.g., the oval surrounding vehicle 800) where the obstacle is located in the area around the vehicle 800 in green.

In FIG. 5, image (c) is an image displayed on the first display unit 320 in the second level warning of the PDW system 300. In the case of the second level warning, the first display unit 320 may display the entire area around the vehicle 800 in yellow or only an area (e.g., the oval surrounding vehicle 800) where the obstacle is located in the area around the vehicle 800 in yellow.

In FIG. 5, image (d) is an image displayed on the first display unit 320 in the third level warning of the PDW system 300. In the case of the third level warning, the first display unit 320 may display the entire area around the vehicle 800 in red or only an area (e.g., the oval surrounding vehicle 800) where the obstacle is located in the area around the vehicle 800 in red.

The image displayed on the first display unit 320 is not limited to the embodiments shown in FIG. 5. In an embodiment, the top view image may be displayed on the first display unit 320. In another embodiment, the first display unit 320 may display an image in which the top view image and the warning image are overlapped. Those skilled in the art will recognize from embodiments of the present disclosure that various images having different colors and surrounding areas may be displayed on the first display unit 320. Further, those skilled in the art will recognize from embodiments of the present disclosure that an additional or auxiliary screen may be provided in addition to the first display unit 320.

The first display unit 320 may be a cluster display and may be configured as a physical device including any one of an LCD display, a PDP display, an OLED display, an FED display, an LED display, a flat panel display, a 3D display, and a transparent display, for example, but embodiments of the present disclosure are not limited thereto.

The PDW power supply unit 330 may drive the PDW system 300 by receiving a driver's input. In an embodiment, the PDW power supply unit 330 may include a power button. However, embodiments of the present disclosure are not limited thereto, as the power button may be a touch type and may be combined with the user input unit 130 to be implemented as a touch screen.

When power is applied to the PDW system 300, information on the obstacle around the vehicle is identified through the object recognition sensor unit 310, and the obstacle information is transmitted to the control unit 200.

The speed sensor unit 400 may sense the driving speed of the vehicle and may transmit the driving speed information to the control unit 200.

The gear sensor unit 500 may sense the operation of a transmission gear lever by a driver's operation and may transmit information about the operation of the transmission gear lever to the control unit 200.

The steering-angle sensor unit 600 may sense the steering angle of the vehicle as a steering wheel is operated and may transmit information about the steering angle to the control unit 200.

The control unit 200 may include at least one core which may execute at least one command. The control unit 200 may execute commands stored in a memory. The control unit 200 may be a single processor or a plurality of processors. The control unit 200 may include at least one of an advanced driver assistance system (ADAS), a central processing unit (CPU), a microprocessor, a graphic processing unit (GPU), application specific integrated circuits (ASICs), or field programmable gate arrays (FPGAs), but embodiments of the present disclosure are not limited thereto.

In an embodiment, the control unit 200 may be implemented with software and hardware including the SVM system 100. The control unit 200 may transform the collected images into a top view image which is a perspective from above the vehicle. Meanwhile, since a specific method in which distorted images of the surroundings of the vehicle are transformed using a perspective transformation matrix and are combined into one top view image is known in an image processing field, a detailed description thereof will be omitted.

In an embodiment, the control unit 200 may change the top view image displayed on the second display unit 120 based on the driver's input. For example, when a user scrolls the touch panel of the user input unit 130, the top view image in which the region of interest is changed according to the scroll input may be formed. Further, when the user touches the touch panel of the user input unit 130, the top view image in which the region of interest is changed according to the touch input may be formed. Meanwhile, since a specific method of performing the perspective transformation by changing a reference point according to the region of interest in the distorted image of the surroundings of the vehicle is known in the image processing field, a detailed description thereof will be omitted.

In an embodiment, the control unit 200 may be implemented with software and hardware including the PDW system 300. In an embodiment, as the driver manipulates a parking safety button, the control unit 200 may recognize a driver's input for activating (turning on) the PDW system 300.

In an embodiment, the control unit 200 may determine the parking warning level for the vehicle to be parked. In some embodiments, the warning level may be divided into four levels (the non-warning level, the first level, the second level, and the third level). The PDW system 300 may recognize the location and distance of the obstacle (e.g., another vehicle, a pillar, a pedestrian, etc.) located around the vehicle 800 through the ultrasonic sensors 310a to 310d. The control unit 200 may determine the parking warning level based on information about the location and/or distance of the obstacle and the vehicle 800. The control unit 200 may transmit the warning level to the SVM system 100 when the warning level is determined.

The SVM system 100 may display the top view image on the first region 120a and the second region 120b based on the warning level and obstacle information transmitted from the control unit 200.

In an embodiment, in the non-warning level, in order to secure a wide field of view for the driver, a front top view or a rear top view is displayed on the first region 120a, and a reduced top view is displayed on the second region 120b. That is, the region of interest (ROI) is set omni-directionally and a top view range is set to the reduced range.

In an embodiment, in the case of the first warning level, an image in which the obstacle is enlarged is displayed on the first region 120a to draw a driver's attention and allow a driver to easily identify a surrounding obstacle, and a reduced top view is displayed on the second region 120b. That is, the region of interest is set to the region around the vehicle in which the obstacle is located, and the top view range is set to the reduced range. However, embodiments of the present disclosure are not limited thereto, as the region of interest which is set by a driver or the omnidirectional region may be displayed on the first region 120a, and a standard top view or an enlarged top view may be displayed on the second region 120b.

In an embodiment, in the case of the second warning level, a more enlarged image of the obstacle is displayed on the first region 120a as compared to the first warning level, and a standard top view is displayed on the second region 120b. However, embodiments of the present disclosure are not limited thereto, as the region of interest which is set by a driver or the omnidirectional region may be displayed on the first region 120a, and a reduced top view or an enlarged top view may be displayed on the second region 120b.

In an embodiment, in the case of the third warning level, a more enlarged image of the obstacle is displayed on the first region 120a as compared to the second warning level, and an enlarged top view is displayed on the second region 120b. However, embodiments of the present disclosure are not limited thereto, as the region of interest which is set by a driver or the omnidirectional region may be displayed on the first region 120a, and a reduced top view or a standard top view may be displayed on the second region 120b.

In an embodiment, the control unit 200 may collect information on the steering angle of the vehicle 800 from the steering-angle sensor unit 600 and may calculate the reverse path of the vehicle based on the collected information on the steering angle and the top view image. The control unit 200 may calculate the collision possibility of the vehicle 800 and the obstacle based on the reverse path, the top view image, and the obstacle information.

In an embodiment, the control unit 200 may provide the reduced and/or enlarged top view image to an RSPA (remote smart parking assist) system with reference to the location and angle of a parking line to easily secure a distance between the vehicle 800 and the parking line, which is minimally required for activating an RSPA function. Thus, it is possible to increase the possibility of the RSPA system recognizing the parking line.

All components shown in FIG. 1 are not essential components of embodiments of the present disclosure, and some components included in the image processing apparatus may be added, changed, or deleted in other embodiments. Meanwhile, the components shown in FIG. 1 represent functional elements which are functionally different from each other, and a plurality of components may be implemented in a form integrated with each other in an actual physical environment. In addition, the function of one component may be distributed and performed in a computer system in a plurality of physical devices.

Figure 6:
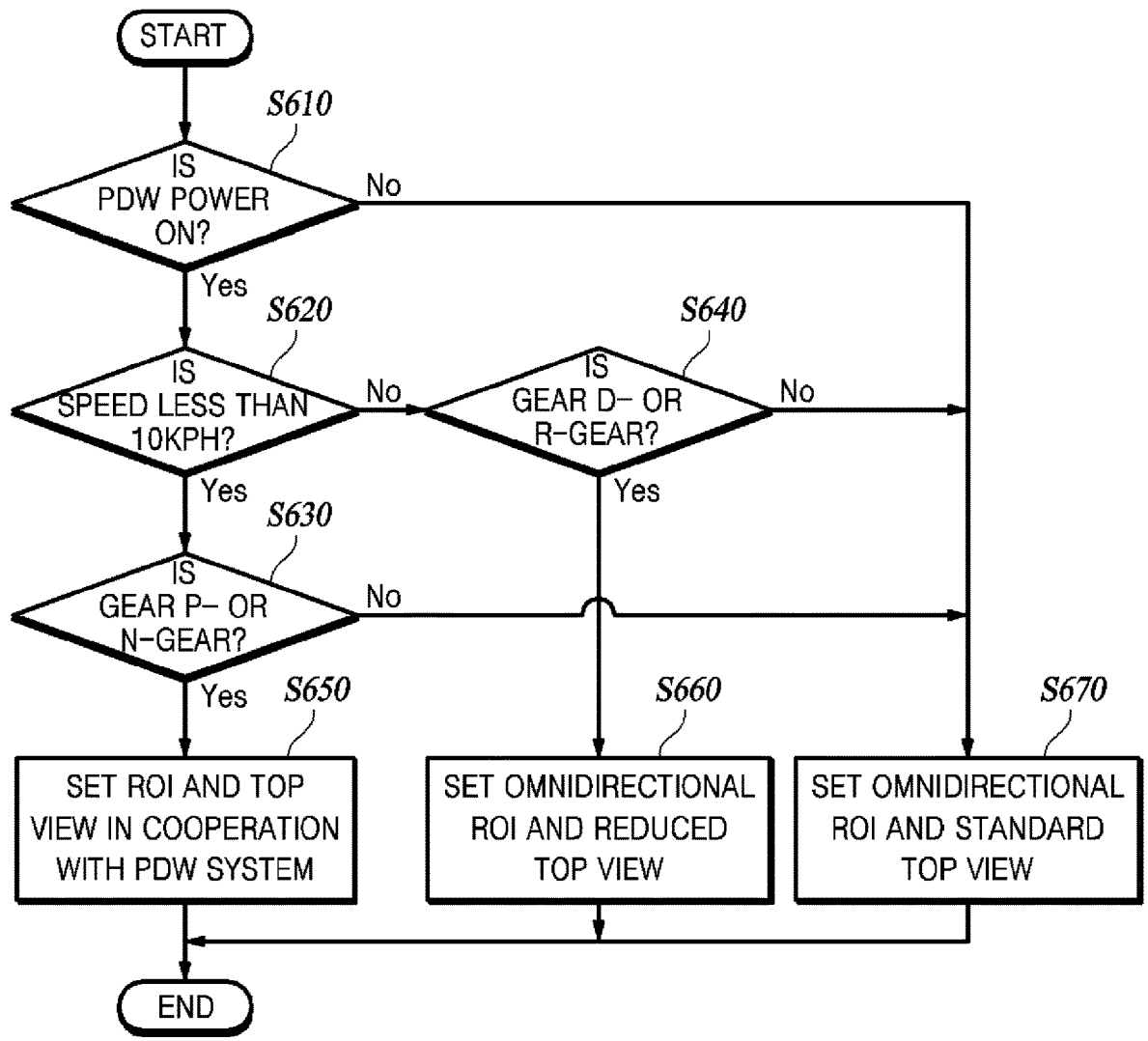
FIG. 6 is a flowchart illustrating a method of operating an image processing apparatus according to an embodiment of the present disclosure.

FIG. 6 is a flowchart illustrating a method of operating an image processing apparatus according to an embodiment of the present disclosure.

In step S610, the control unit 200 determines whether the driver applies power to the PDW system 300 from the PDW power supply unit 330.

When power is not applied to the PDW system 300, the process moves from step S610 to step S670. In step S670, the second display unit 120 displays a front top view having the front as the region of interest in the first region 120*a* by default and displays a standard top view in the second region 120*b*. In another embodiment, the driver may individually control the SVM system. Therefore, when the driver sets the region of interest differently from the default, different images may be displayed on the first region 120*a* and the second region 120*b*.

When power is applied to the PDW system 300, the process moves from step S610 to step S620. In step S620, the control unit 200 determines whether the speed of the vehicle 800 is less than a preset speed (e.g., 10 kph) based on information on the speed of the vehicle 800 obtained from the speed sensor unit 400.

When the speed of the vehicle 800 is equal to or greater than the preset speed, the process moves from step S620 to step S640. In step S640, the control unit 200 determines whether the gear of the vehicle 800 is set to a D-gear (drive) or an R-gear (reverse) based on the transmission gear information of the vehicle 800 obtained from the gear sensor unit 500.

When the gear of the vehicle 800 is the D-gear or the R-gear, the process moves from step S640 to step S660. If the vehicle 800 is driven at a preset speed or faster and the gear is the D-gear or the R-gear, it is necessary to provide a wide field of view to the driver. Therefore, in step S660, the second display unit 120 displays a front top view having the front area as the region of interest in the first region 120*a* by default and displays a reduced top view in the second region 120*b*. In another embodiment, the driver may individually control the SVM system. Therefore, when the driver sets the region of interest differently from the default, different images may be displayed on the first region 120*a* and the second region 120*b*.

When the gear of the vehicle 800 is not the D-gear or the R-gear, the process moves from step S640 to step S670. However, embodiments of the present disclosure are not limited thereto, and in another embodiment, the process may move to step S660 or step S670 regardless of the gear information of the vehicle 800. In a further embodiment, when the gear of the vehicle 800 is the D-gear or the R-gear, the process may move to step S670.

Returning back to step S620, when the speed of the vehicle 800 is less than a preset speed, the process moves from step S620 to step S630. In step S630, the control unit 200 determines whether the gear of the vehicle 800 is set to a P-gear (park) or an N-gear (neutral) through the transmission gear information of the vehicle 800 obtained from the gear sensor unit 500.

When the gear of the vehicle 800 is the P-gear or the N-gear, the process moves from step S630 to step S650. In step S650, the SVM system 100 and the PDW system 300 are cooperatively operated. Such a cooperative operation may be performed through the control unit 200. A detailed process in which the SVM system 100 and the PDW system 300 are cooperatively operated will be described below with reference to FIGS. 7A to 7E.

When the gear of the vehicle 800 is not the P-gear or the N-gear, the process moves from step S630 to step S670. However, embodiments of the present disclosure are not limited thereto, and in another embodiment, the process may move to step S650 or step S670 regardless of the gear information of the vehicle 800. In a further embodiment, when the gear of the vehicle 800 is the P-gear or the N-gear, the process may move to step S670.

FIGS. 7A to 7E are conceptual diagrams illustrating the cooperative operation between the SVM system 100 and the PDW system 300 according to embodiments of the present disclosure.

Figure 7A:
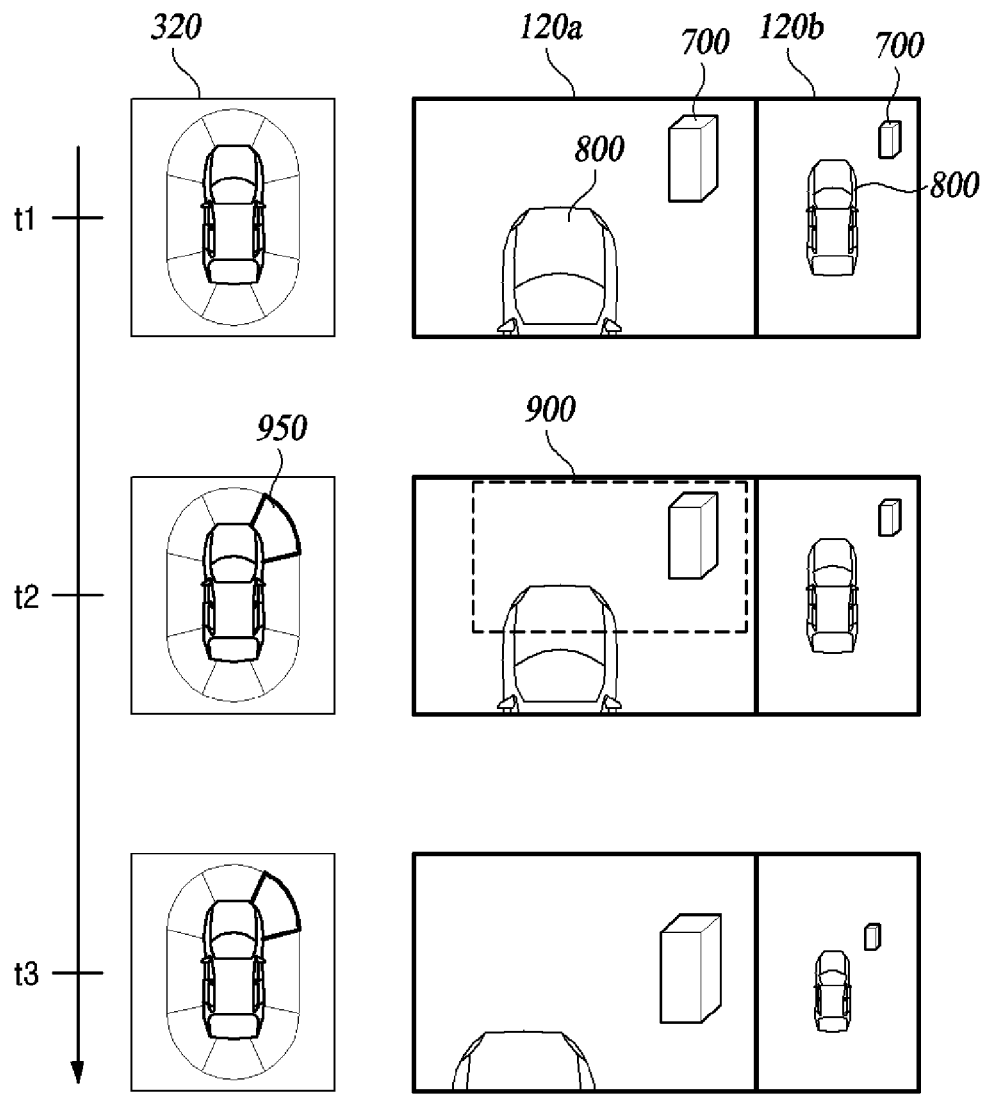
FIGS. 7A to 7E are conceptual diagrams illustrating a cooperative operation between an SVM system and a PDW system according to embodiments of the present disclosure.

FIG. 7A is a conceptual diagram illustrating the cooperative operation between the SVM system 100 and the PDW system 300 according to the time sequence t1, t2, and t3 in the first level warning situation in the image control device according to an embodiment of the present disclosure. For the redundant components shown in FIG. 7A, reference numerals will be omitted for the convenience of understanding.

Referring to FIG. 7A, in the non-warning level just before the PDW system 300 recognizes the obstacle 700 (t1), the parking warning is not displayed on the first display unit 320, the front top view is displayed on the first region 120*a* of the second display unit 120, and the omnidirectional standard top view is displayed on the second region 120*b*.

Immediately after the PDW system 300 recognizes the obstacle 700 (t2), a warning light 950 is displayed on the first display unit 320 in a direction in which the obstacle is located, and a new region of interest 900 is set.

Afterwards (t3), the top view image according to the new region of interest 900 is displayed on the first region 120*a* and the second region 120*b*.

Referring to FIG. 7A, the obstacle 700 is located on the right side of the front of the vehicle 800, and a distance between the obstacle 700 and the vehicle 800 falls within a preset first level warning distance range. The object recognition sensor unit 310 transmits information including the ultrasonic signal reflected from the obstacle 700 and/or the ultrasonic sensor (at least one of 310*a* to 310*d*) receiving the ultrasonic signal to the control unit 200. The control unit 200 calculates the location, distance, and/or angle of the obstacle 700 based on information received from the object recognition sensor unit 310. The control unit 200 determines the warning level as the first level based on the calculated result.

The control unit 200 transmits information about the location, distance, and/or warning level of the obstacle 700 to the first display unit 320. The first display unit 320 displays the warning light 950 in the direction in which the obstacle is located based on information received from the control unit 200.

The control unit 200 determines the new region of interest 900 based on the image collected from the image collection unit 110, the warning level obtained from the PDW system 300, and information on the obstacle 700. The new region of interest 900 is determined as a region which includes the obstacle 700 and is narrower than the omnidirectional region of interest so that the driver can more easily identify the obstacle 700. The control unit 200 transforms and combines collected images according to the new region of interest 900 to generate the top view image focused on the obstacle 700. The control unit 200 transmits the generated image to the second display unit 120. The top view image in which the obstacle 700 is focused is displayed on the first region 120*a* of the second display unit 120, and the omnidirectional reduced top view image is displayed on the second region 120*b* so that the driver can easily identify the situation around where the vehicle 800 and the obstacle 700 are located.

However, embodiments of the present disclosure are not limited thereto. In another embodiment, a driver may change, reduce, and enlarge the region of interest by touching or scrolling the first region 120*a* and/or the second region 120*b* which is set in the image control device.

Figure 7B:
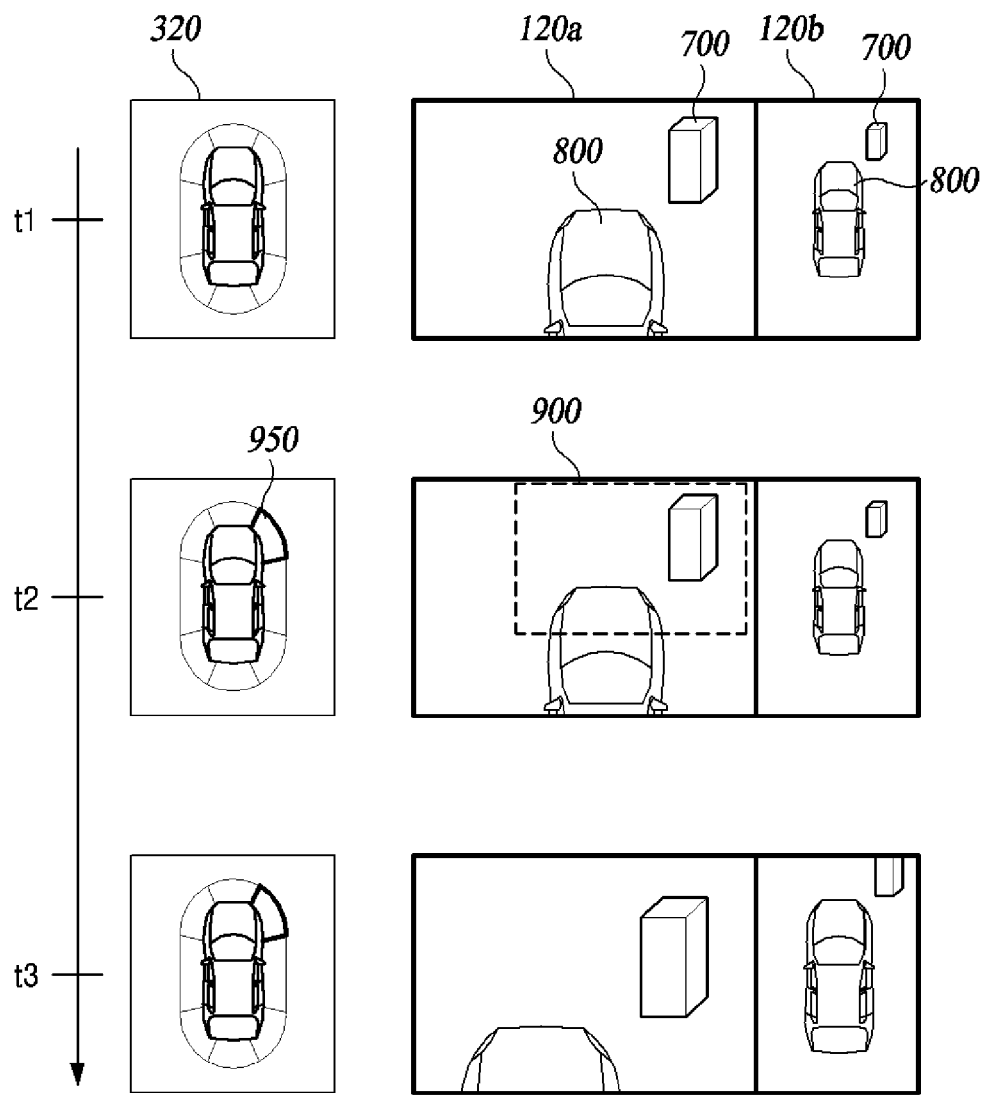

FIG. 7B is a conceptual diagram illustrating the cooperative operation between the SVM system 100 and the PDW system 300 according to the time sequence t1, t2, and t3 in the third level warning situation in the image control device according to an embodiment of the present disclosure. For the redundant components shown in FIG. 7B, reference numerals will be omitted for the convenience of understanding.

Referring to FIG. 7B, in the non-warning level just before the PDW system 300 recognizes the obstacle 700 (t1), the parking warning is not displayed on the first display unit 320, the front top view is displayed on the first region 120*a* of the second display unit 120, and the omnidirectional standard top view is displayed on the second region 120*b*.

Immediately after the PDW system 300 recognizes the obstacle 700 (t2), a warning light 950 is displayed on the first display unit 320 in a direction in which the obstacle is located, and a new region of interest 900 is set.

Afterwards (t3), the top view image according to the new region of interest 900 is displayed on the first region 120*a* and the second region 120*b*.

Referring to FIG. 7B, the obstacle 700 is located on the right side of the front of the vehicle 800, and a distance between the obstacle 700 and the vehicle 800 falls within a preset third level warning distance range. The object recognition sensor unit 310 transmits information including the ultrasonic signal reflected from the obstacle 700 and/or the ultrasonic sensor (at least one of 310*a* to 310*d*) receiving the ultrasonic signal to the control unit 200. The control unit 200 calculates the location, distance, and/or angle of the obstacle 700 based on information received from the object recognition sensor unit 310. The control unit 200 determines the warning level as the third level based on the calculated result.

The control unit 200 transmits information about the location, distance, and/or warning level of the obstacle 700 to the first display unit 320. The first display unit 320 displays the warning light 950 in the direction in which the obstacle is located based on information received from the control unit 200.

The control unit 200 determines the new region of interest 900 based on the image collected from the image collection unit 110, the warning level obtained from the PDW system 300, and information on the obstacle 700. The new region of interest 900 is determined as a region which includes the obstacle 700 and is narrower than the omnidirectional region of interest so that the driver can more easily identify the obstacle 700. The control unit 200 transforms and combines collected images according to the new region of interest 900 to generate the top view image focused on the obstacle 700. The control unit 200 transmits the generated image to the second display unit 120. The top view image in which the obstacle 700 is focused is displayed on the first region 120*a* of the second display unit 120, and the omnidirectional enlarged top view image is displayed on the second region 120*b* so that the driver can easily identify the locations of the vehicle 800 and the obstacle 700.

However, embodiments of the present disclosure are not limited thereto. In another embodiment, a driver may change, reduce, and enlarge the region of interest by touching or scrolling the first region 120*a* and/or the second region 120*b* which is set in the image control device.

Figure 7C:
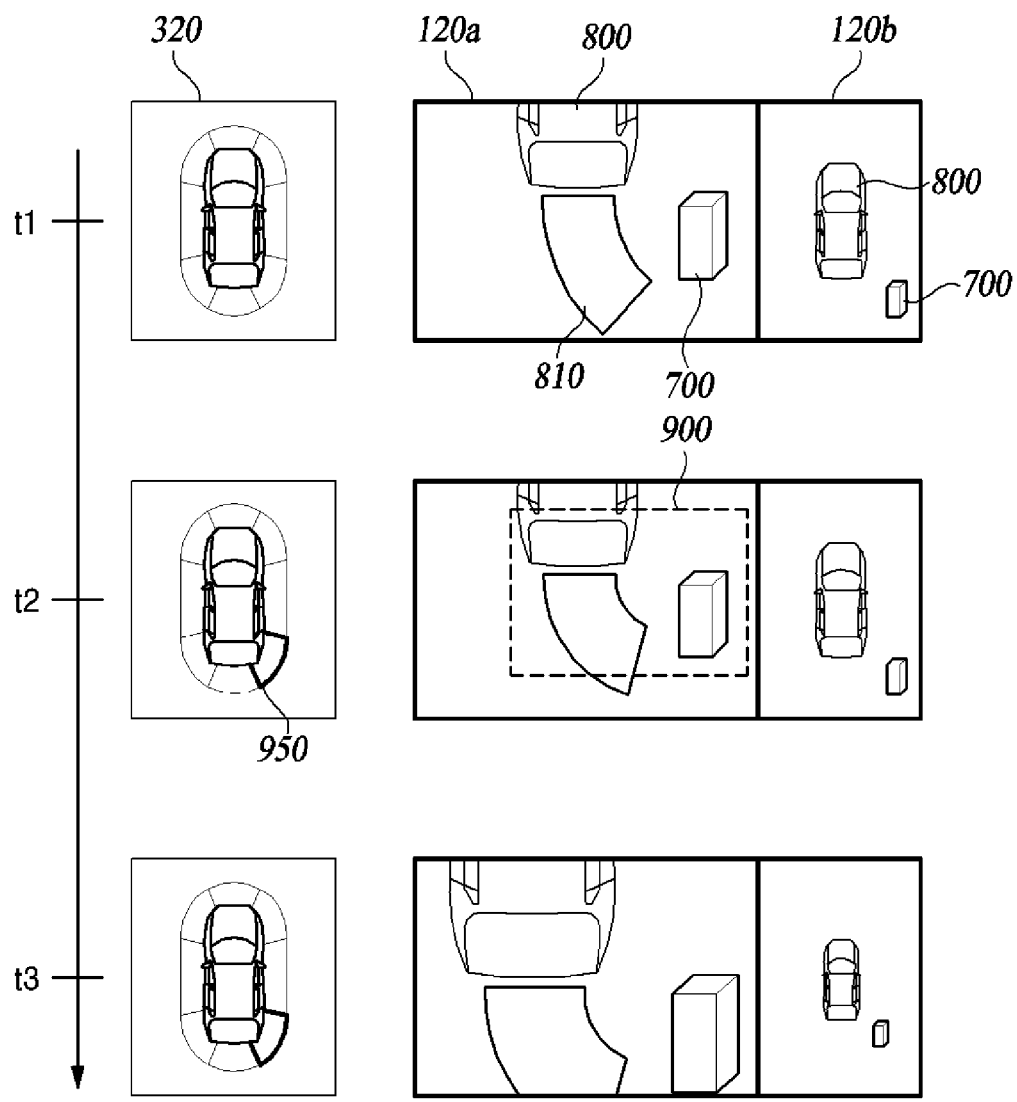

FIG. 7C is a conceptual diagram illustrating the cooperative operation between the SVM system 100 and the PDW system 300 based on the steering angle of the vehicle 800 according to the time sequence t1, t2, and t3, in the image control device according to an embodiment of the present disclosure. For the redundant components shown in FIG. 7C, reference numerals will be omitted for the convenience of understanding.

FIG. 7C shows a situation where the vehicle 800 is reversing. Referring to FIG. 7C, a reverse path 810 according to the steering angle of the vehicle 800 is shown in the first region 120*a*. In an embodiment, the reverse path 810 may be displayed on the first region 120*a* and/or the second region 120*b* so that the driver can easily identify the reverse path 810. However, in another embodiment, the reverse path 810 may exist only conceptually for the cooperative operation of the SVM system 100 and the PDW system 300.

Referring to FIG. 7C, just before the PDW system 300 recognizes the obstacle 700 (t1) and/or when there is no risk of collision between the vehicle 800 and the obstacle 700, the parking warning is not displayed on the first display unit 320, the rear top view is displayed on the first region 120*a* of the second display unit 120, and the omnidirectional standard top view is displayed on the second region 120*b*.

When the PDW system 300 recognizes the obstacle 700 (t2) and the vehicle 800 simultaneously reverses along the reverse path 810 so that there is a risk of collision between the vehicle 800 and the obstacle 700, the warning light 950 is displayed on the first display unit 320 in a direction in which the obstacle is located, and a new region of interest 900 is set.

Afterwards (t3), the top view image according to the new region of interest 900 is displayed on the first region 120*a* and the second region 120*b*.

Referring to FIG. 7C, the obstacle 700 is located on the right side of the rear of the vehicle 800, and a distance between the obstacle 700 and the vehicle 800 falls within a preset third level warning distance range. Since the process of the control unit 200 and the PDW system 300 determining the warning level has been described above, a redundant description thereof will be omitted.

The control unit 200 determines the new region of interest 900 based on the steering angle received from the steering-angle sensor unit 600, the image of the surroundings received from the image collection unit 110, the warning level received from the PDW system 300, and information on the obstacle 700.

More specifically, the control unit 200 first generates the top view image by transforming and combining collected images. The control unit 200 calculates the reverse path 810 of the vehicle 800 based on the generated top view image and steering-angle information. The control unit 200 determines the new region of interest 900 including the reverse path 810 and the obstacle 700 based on the reverse path 810 and the obstacle 700 information. The control unit 200 generates a new top view image focused on the reverse path 810 and the obstacle 700 by retransforming and recombining collected images according to the new region of interest 900.

The control unit 200 transmits the generated image to the second display unit 120. The top view image in which the reverse path 810 and the obstacle 700 are focused is displayed on the first region 120a of the second display unit 120, and the omnidirectional enlarged top view image is displayed on the second region 120b to allow the driver to move to another space for avoiding the obstacle 700.

However, embodiments of the present disclosure are not limited thereto. In another embodiment, a driver may change, reduce, and enlarge the region of interest by touching or scrolling the first region 120a and/or the second region 120b which is set in the image control device.

Figure 7D:
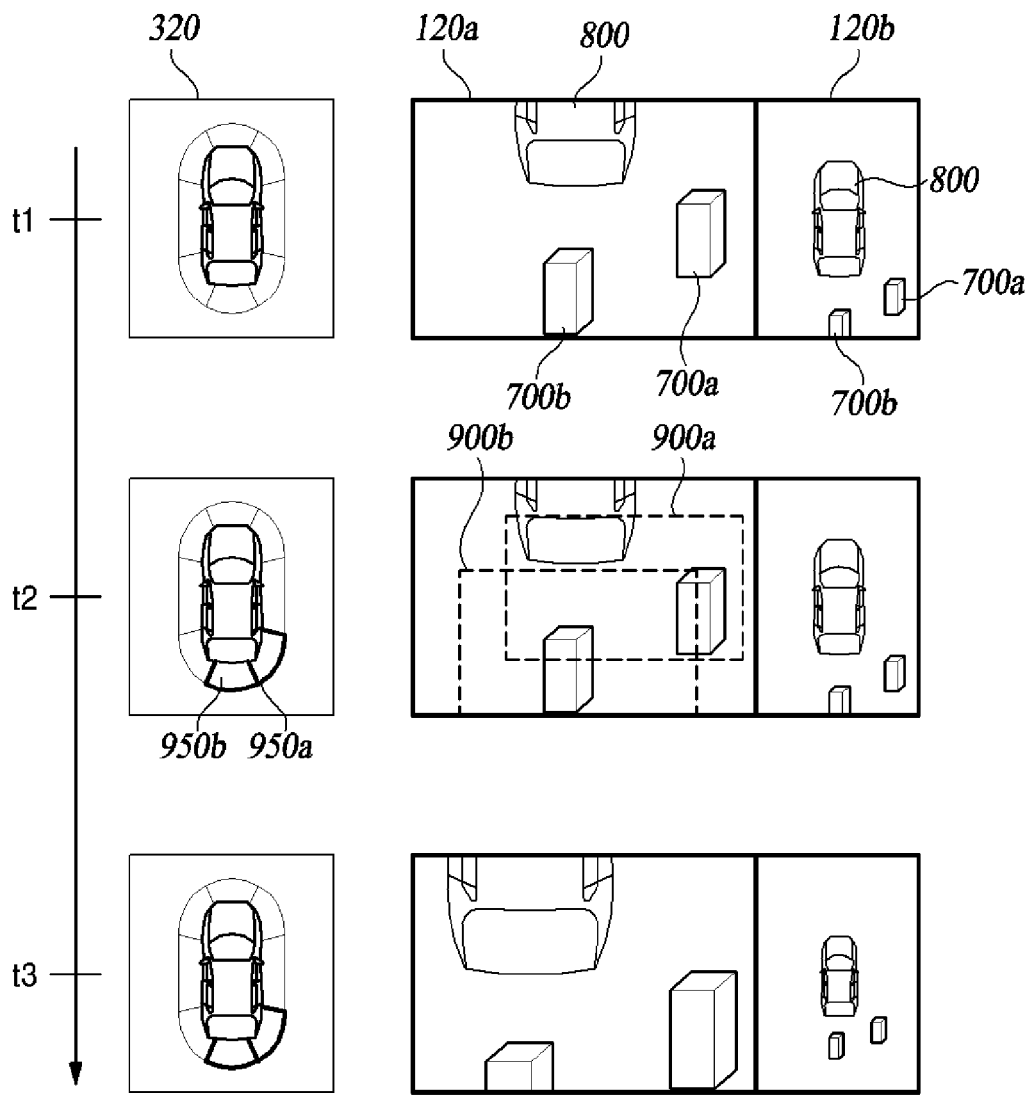

FIG. 7D is a conceptual diagram illustrating the cooperative operation between the SVM system 100 and the PDW system 300 based on the locations of the obstacles 700a and 700b according to the time sequence t1, t2, and t3, in the image control device according to an embodiment of the present disclosure. For the redundant components shown in FIG. 7D, reference numerals will be omitted for the convenience of understanding.

Referring to FIG. 7D, in the non-warning level just before the PDW system 300 recognizes the obstacles 700a and 700b (t1), the parking warning is not displayed on the first display unit 320, the rear top view is displayed on the first region 120a of the second display unit 120, and the omni-directional standard top view is displayed on the second region 120b.

Immediately after the PDW system 300 recognizes the obstacles 700a and 700b (t2), warning lights 950a and 950b are displayed on the first display unit 320 in directions in which the obstacles are located, and new regions of interest 900a and 900b are set.

Referring to FIG. 7D, all the distances between the vehicle and the obstacles 700a and 700b fall within a preset third level warning distance range. Since the process of the control unit 200 and the PDW system 300 determining the warning level has been described above, a redundant description thereof will be omitted. The right rear obstacle 700a and the rear obstacle 700b are located around the vehicle 800, and a distance between the right rear obstacle 700a and the vehicle 800 is greater than a distance between the rear obstacle 700b and the vehicle 800.

The control unit 200 may set the region of interest by assigning a weight to an angle among a plurality of obstacles having the same warning level.

In an embodiment where a weight is assigned to the angle, the control unit 200 may assign a high weight to an obstacle located in a diagonal direction having a relatively high probability of collision. In this case, the region of interest 900a focused on the right rear obstacle 700a is determined.

Afterwards (t3), the top view image according to the third level warning and the new region of interest 900a in which a weight is assigned to the angle of the obstacle is displayed in the first region 120a and the second region 120b.

In an embodiment, an angle between the vehicle 800 and the obstacle to which the weight is assigned may be determined with a region where space maps assigned to each of the cameras 110a to 110d overlap. In another embodiment, the angle between the vehicle 800 and the obstacle to which the weight is assigned may be determined as an angle at which a collision is most likely to occur according to steering angle information received from the steering-angle sensor unit 600.

Figure 7E:
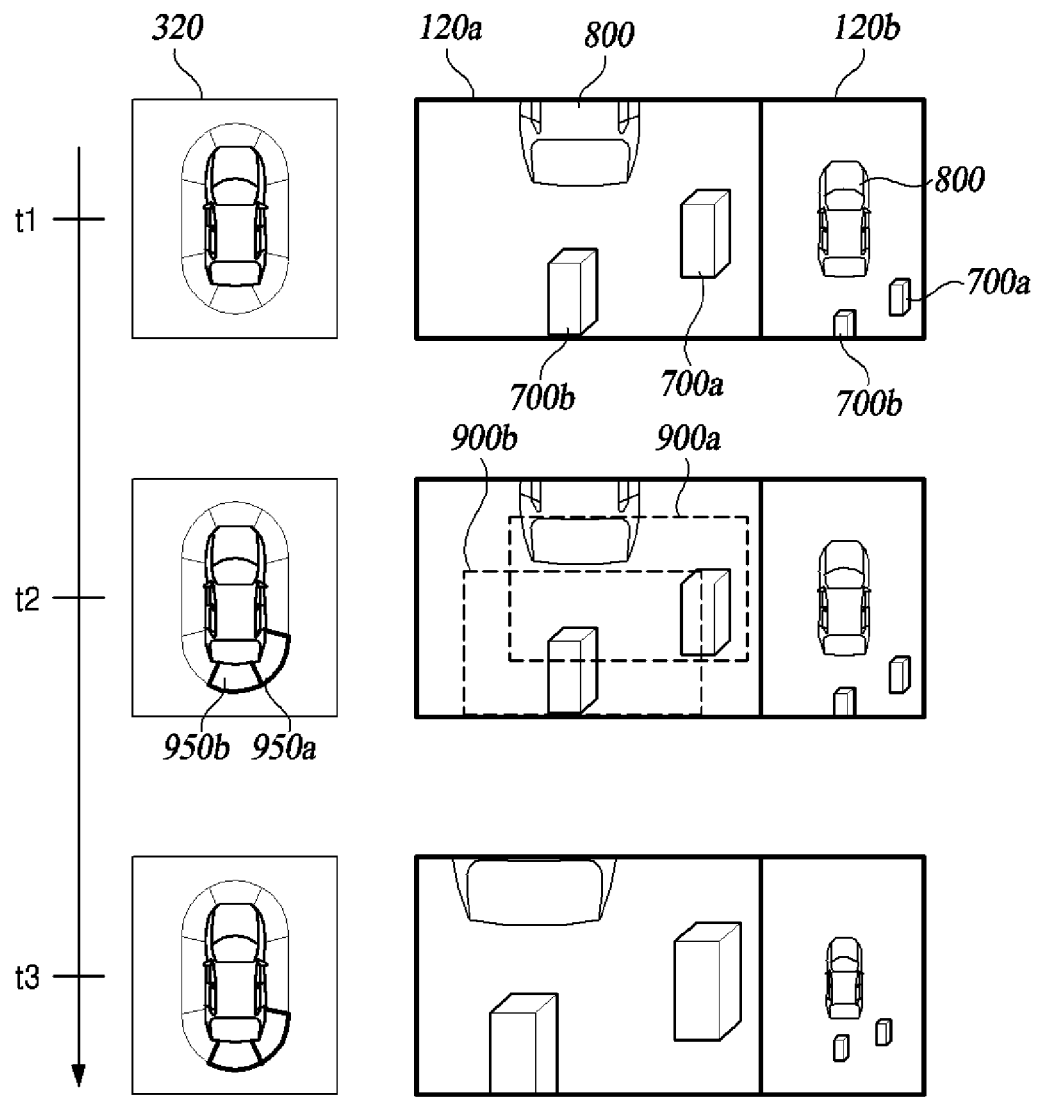

FIG. 7E is a conceptual diagram illustrating the cooperative operation between the SVM system 100 and the PDW system 300 according to the locations of the obstacles 700a and 700b according to the time sequence t1, t2, and t3, in the image control device according to an embodiment of the present disclosure. For the redundant components shown in FIG. 7E, reference numerals will be omitted for the convenience of understanding.

Referring to FIG. 7E, in the non-warning level just before the PDW system 300 recognizes the obstacles 700a and 700b (t1), the parking warning is not displayed on the first display unit 320, the rear top view is displayed on the first region 120a of the second display unit 120, and the omnidirectional standard top view is displayed on the second region 120b.

Immediately after the PDW system 300 recognizes the obstacles 700a and 700b (t2), warning lights 950a and 950b are displayed on the first display unit 320 in directions in which the obstacles are located, and new regions of interest 900a and 900b are set.

Referring to FIG. 7E, all the distances between the vehicle and the obstacles 700a and 700b fall within a preset third level warning distance range. Since the process of the control unit 200 and the PDW system 300 determining the warning level has been described above, a redundant description thereof will be omitted. The right rear obstacle 700a and the rear obstacle 700b are located around the vehicle 800, and a distance between the right rear obstacle 700a and the vehicle 800 is greater than a distance between the rear obstacle 700b and the vehicle 800.

The control unit 200 may set the region of interest by assigning a weight to a distance among a plurality of obstacles having the same warning level.

In an embodiment in which a weight is assigned to the distance, the control unit 200 may assign a high weight to an obstacle located within a short distance having a relatively high probability of collision. In this case, the region of interest 900b focused on the rear obstacle 700b is determined.

Afterwards (t3), the top view image according to the third level warning and the new region of interest 900b in which the weight is assigned to the distance of the obstacle is displayed in the first region 120a and the second region 120b.

Figure 8A:
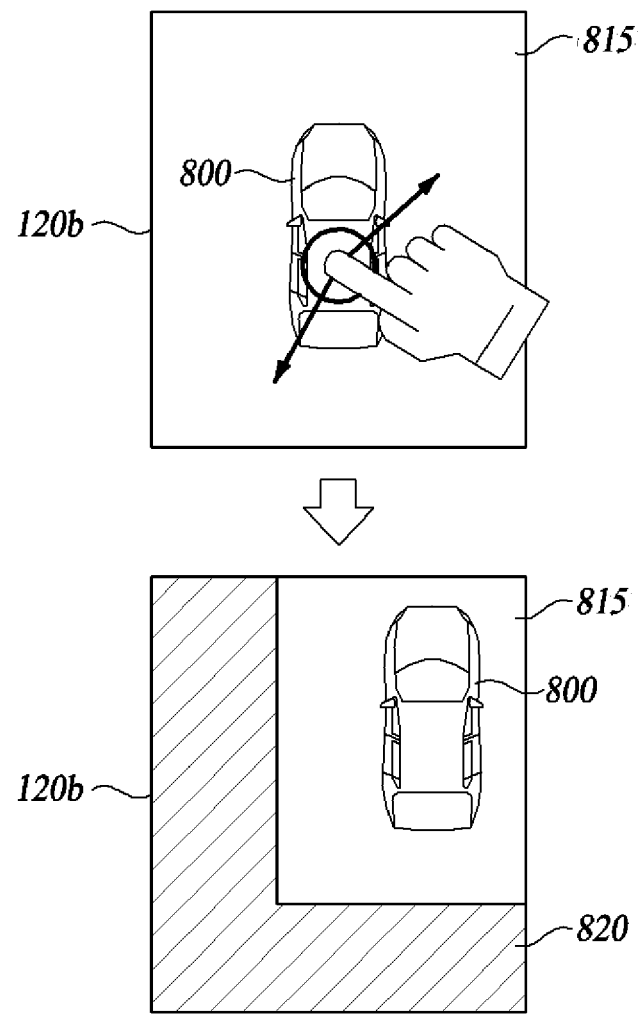
FIGS. 8A and 8B are conceptual diagrams illustrating a top view image setting process of a user in an image control device according to some embodiments of the present disclosure.
Figure 8B:
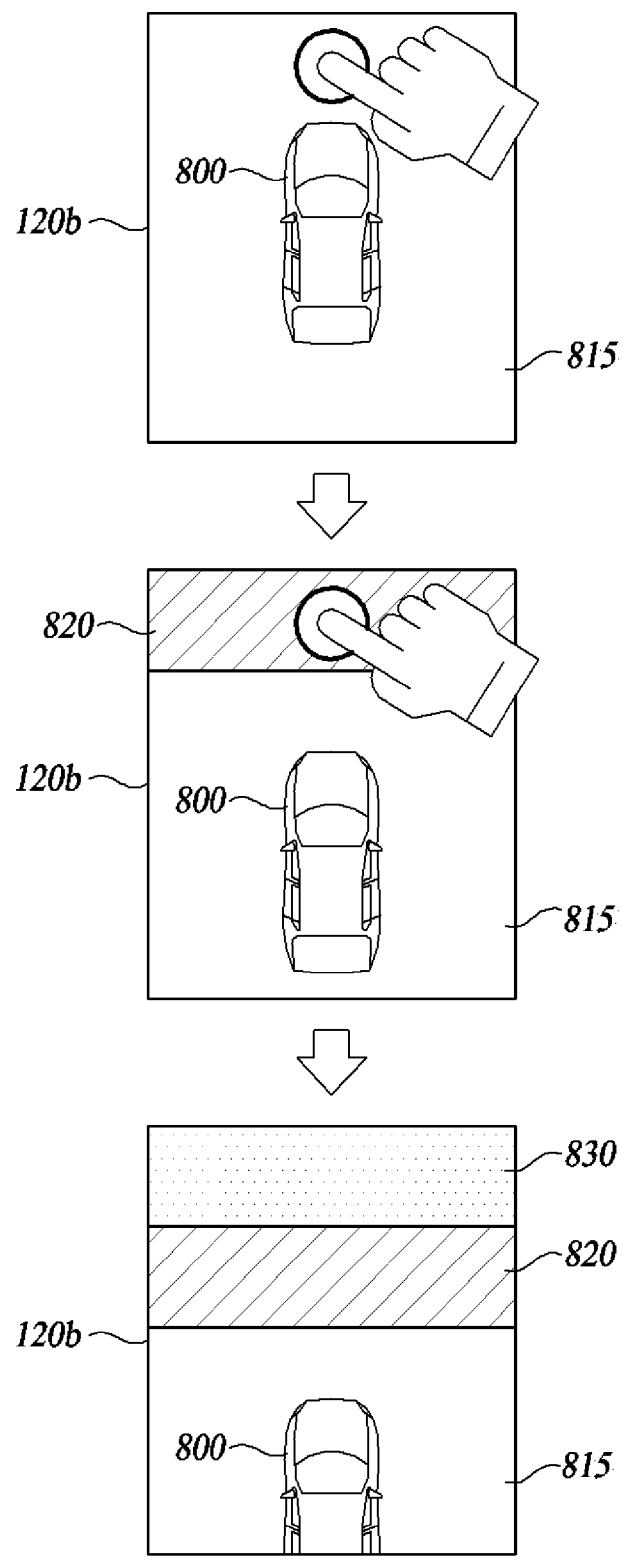

FIG. 8A and FIG. 8B are conceptual diagrams illustrating an image setting process as pixels of the camera increase and the region of interest varies in the image control device according to an embodiment of the present disclosure.

FIG. 8A and FIG. 8B illustrate a process in which the region of interest is changed as a driver scrolls or touches the touch panel, when the user input unit 130 includes the touch panel, in the image control device according to an embodiment of the present disclosure.

Referring to FIG. 8A and FIG. 8B, when the touch panel is coupled to the second display unit 120 in a stacked structure, the touch panel may correspond to the first region 120a and/or the second region 120b.

Referring to FIG. 8A, the driver may scroll the second region 120b where the top view image of the region of interest 815 by default is displayed. If the driver scrolls any location on the second region 120b, the user input unit 130 may recognize the driver's scroll length and direction.

The control unit 200 receives scroll information from the user input unit 130. Based on the scroll information, the control unit 200 generates a new top view image including a new region of interest 820 and displays it on the second region 120b.

The control unit 200 may generate the top view image of the region of interest which is set by a user to the extent that distortion of the top view image does not occur based on the pixel information of the cameras 110a to 110d.

In another embodiment, when a preset time interval is exceeded, the control unit 200 may restore the region of interest changed by the driver to the default. In the case that the region of interest is restored to the default, the second region 120b returns to an initial screen shown in FIG. 8A.

Referring to FIG. 8B, the driver may touch the second region 120b on which the top view image of the default region of interest 815 is displayed. When the driver touches the front location of the vehicle 800 displayed on the second region 120b, the user input unit 130 may recognize a driver's touch location.

The control unit 200 receives touch information from the user input unit 130. Based on the touch information, the control unit 200 generates a new top view image including a new region of interest 820 and displays it on the second region 120b.

The driver may set a region of interest 830 which is further enlarged to the front of the vehicle 800 by touching the new region of interest 820. The control unit 200 may generate the top view image of the region of interest which is set by a user to the extent that distortion of the top view image does not occur based on the pixel information of the cameras 110a to 110d.

In another embodiment, when a preset time interval is exceeded, the control unit 200 may restore the region of interest changed by the driver to the default. In the case that the region of interest is restored to the default, the second region 120b returns to an initial screen shown in FIG. 8B.

Each component of the apparatus or method according to embodiments of the present disclosure may be implemented as hardware or software or a combination of hardware and software. Further, the function of each component may be implemented as software and a microprocessor may be implemented to execute the function of software corresponding to each component.

Various implementations of systems and techniques described herein may be realized as digital electronic circuits, integrated circuits, field programmable gate arrays (FPGAs), application specific integrated circuits (ASICs), computer hardware, firmware, software, and/or combinations thereof. These various implementations may include one or more computer programs executable on a programmable system. The programmable system includes at least one programmable processor (which may be a special-purpose processor or a general-purpose processor) coupled to receive and transmit data and instructions from and to a storage system, at least one input device, and at least one output device. The computer programs (also known as programs, software, software applications, or codes) contain commands for a programmable processor and are stored in a "computer-readable recording medium".

The computer-readable recording medium includes all types of recording devices in which data readable by a computer system is stored. Such a computer-readable recording medium may be a non-volatile or non-transitory medium, such as ROM, a CD-ROM, a magnetic tape, a floppy disk, a memory card, a hard disk, a magneto-optical disk, or a storage device, and may further include a transitory medium such as a data transmission medium. In addition, the computer-readable recording medium may be distributed in a computer system connected via a network, so that computer-readable codes may be stored and executed in a distributed manner.

The flowchart/timing diagram of the present specification describes that processes are sequentially executed, but this is merely illustrative of the technical idea of an embodiment of the present disclosure. In other words, since it is apparent to those skilled in the art that an order described in the flowchart/timing diagram may be changed or one or more processes may be executed in parallel without departing from the essential characteristics of an embodiment of the present disclosure, the flowchart/timing diagram is not limited to a time-series order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An image processing apparatus comprising:
a plurality of cameras configured to collect a plurality of images surroundings around a vehicle;
a plurality of object recognition sensors configured to collect obstacle location information of a plurality of obstacles located around the vehicle;
a controller configured to generate one or more top view images based on the plurality of images of the surroundings and to determine whether to display a parking warning image based on the obstacle location information; and
a first display configured to display the parking warning image; and
a second display configured to display the one or more top view image, images;
wherein the controller is configured to:
select a parking warning level from a plurality of preset parking warning levels based on the obstacle location information;
display the parking warning image corresponding to the selected parking warning level on the first display; and
in response to the determination to display the parking warning image, display the top view image of the plurality of obstacles on the second display, wherein in a situation in which each obstacle of the plurality of obstacles has the same parking warning level, display the top view image focused on an obstacle located in a diagonal direction of the vehicle based on a steering angle of the vehicle and directions from the vehicle to the plurality of obstacles.

2. The apparatus of claim 1, wherein:
the second display is divided into a plurality of regions including a first region and a second region; and
in response to the determination to display the parking warning image, the controller is configured to automatically display a first top view image focused on the plurality of obstacles on the first region and automatically display a second top view image including all regions around the vehicle on the second region.

3. The apparatus of claim 2, wherein the controller is configured to: control such that the first top view image in which a width of a region of interest is changed is automatically displayed on the first region and the second top view image in which the width of the region of interest is changed is automatically displayed on the second region according to the selected parking warning level.

4. The apparatus of claim 3, wherein the controller is configured to control such that the first top view image in which the width of the region of interest is reduced is automatically displayed on the first region and the second top view image in which the width of the region of interest is enlarged is automatically displayed on the second region according to the selected parking warning level.

5. The apparatus of claim 3, further comprising a speed sensor configured to detect a speed of the vehicle and transmit information about the speed to the controller, wherein the controller is configured to control to display the first top view image and the second top view image corresponding to the selected parking warning level on the second display in response to the detected speed being less than a preset speed.

6. The apparatus of claim 3, further comprising a gear sensor configured to detect an operation of a transmission gear lever and transmit information about the operation of the transmission gear lever to the controller, wherein the controller is configured to control to display the first top view image and the second top view image corresponding to the selected parking warning level on the second display in response to the transmission gear lever being set to any gear of a plurality of preset gears.

7. The apparatus of claim 3, further comprising a steering-angle sensor configured to detect the steering angle of the vehicle and transmit information about the steering angle to the controller, wherein the controller is configured to:
calculate a reverse path of the vehicle based on the steering angle and the top view image;
calculate a collision possibility between the obstacle and the vehicle based on the reverse path and the obstacle location information; and
generate the first top view image and the second top view image based on the collision possibility, the parking warning level, or the obstacle location information.

8. The apparatus of claim 1, further comprising a user input device configured to recognize an input in a scroll method or a touch method, wherein the controller is configured to generate the top view image in which a region of interest is changed based on the input.

9. An image processing method, the method comprising:
collecting a plurality of images of surroundings around a vehicle using a plurality of cameras attached to the vehicle;
collecting obstacle location information of a plurality of obstacles located around the vehicle;
determining, for each of the plurality of obstacles, a parking warning level from a plurality of preset parking warning levels based on the obstacle location information, wherein each obstacle of the plurality of obstacles has the same parking warning level;
displaying a parking warning image corresponding to the determined parking warning level on a first display;
generating a top view image focused on the plurality of obstacles based on the plurality of images of the surroundings and the obstacle location information, wherein the top view image is focused on an obstacle located in a diagonal direction of the vehicle based on a steering angle of the vehicle and directions from the vehicle to the one or more obstacles; and
displaying the top view image on a second display.

10. The method of claim 9, wherein generating the top view image comprises:

automatically generating a first top view image focused on the plurality of obstacle on a first region of the second display; and
automatically generating a second top view image including all regions around the vehicle on a second region of the second display.

11. The method of claim 10, wherein: generating the top view image comprises:
automatically displaying the first top view image in which a width of a region of interest is changed on the first region according to the parking warning level; and
automatically displaying the second top view image in which the width of the region of interest is changed on the second region according to the parking warning level.

12. The method of claim 11, wherein: generating the top view image further comprises:
automatically displaying the first top view image in which the width of the region of interest is reduced on the first region according to the parking warning level; and
automatically displaying the second top view image in which the width of the region of interest is enlarged on the second region according to the parking warning level.

13. The method of claim 11, wherein generating the top view image further comprises determining whether a speed of the vehicle is less than a preset speed.

14. The method of claim 11, wherein generating the top view image further comprises determining whether a transmission gear lever of the vehicle is set to any gear of a plurality of preset gears.

15. The method of claim 11, wherein generating the top view image comprises:
calculating a reverse path of the vehicle based on the steering angle of the vehicle and the top view image;
calculating a collision possibility between the plurality of obstacles and the vehicle based on the reverse path and the obstacle location information; and
generating the first top view image and the second top view image based on the collision possibility, the parking warning level, or the obstacle location information.

16. An image processing method, the method comprising:
collecting a plurality of images of surroundings around a vehicle using a plurality of cameras attached to the vehicle;
collecting obstacle location information of a plurality of obstacles located around the vehicle;
determining, for each of the plurality of obstacles, a parking warning level from a plurality of preset parking warning levels based on the obstacle location information, wherein each obstacle of the plurality of obstacles has the same parking warning level;
displaying a parking warning image corresponding to the determined parking warning level on a first display;
generating a top view image focused on the plurality of obstacles based on the plurality of images of the surroundings and the obstacle location information, wherein the top view image is focused on an obstacle located in a diagonal direction of the vehicle based on a steering angle of the vehicle and directions from the vehicle to the plurality of obstacles;
displaying the top view image on a second display; and
recognizing an input that is input according to a scroll method or a touch method; and
re-generating the top view image in which a region of interest is changed based on the input.

17. The method of claim 16, wherein generating the top view image comprises:
- automatically generating a first top view image focused on the plurality of obstacles on a first region of the second display; and
- automatically generating a second top view image including all regions around the vehicle on a second region of the second display.

18. The method of claim 17, wherein generating the top view image comprises:
- automatically displaying the first top view image in which a width of the region of interest is changed on the first region according to the parking warning level; and
- automatically displaying the second top view image in which the width of the region of interest is changed on the second region according to the parking warning level.

19. The method of claim 18, wherein generating the top view image further comprises:
- automatically displaying the first top view image in which the width of the region of interest is reduced on the first region according to the parking warning level; and
- automatically displaying the second top view image in which the width of the region of interest is enlarged on the second region according to the parking warning level.

20. The method of claim 18, wherein generating the top view image further comprises:
- determining whether a speed of the vehicle is less than a preset speed; and
- determining whether a transmission gear lever of the vehicle is set to any gear of a plurality of preset gears.

* * * * *

UNITED STATES PATENT AND TRADEMARK OFFICE
CERTIFICATE OF CORRECTION

PATENT NO. : 12,407,794 B2  
APPLICATION NO. : 18/345323  
DATED : September 2, 2025  
INVENTOR(S) : Min Chul Kang Page 1 of 1

It is certified that error appears in the above-identified patent and that said Letters Patent is hereby corrected as shown below:

In the Claims

In Column 16, Line 37, Claim 1:  
Change "view image, images;"  
To --view image,--

Signed and Sealed this  
Fourteenth Day of October, 2025

John A. Squires  
*Director of the United States Patent and Trademark Office*